US007463951B2

(12) United States Patent
Ampunan et al.

(10) Patent No.: US 7,463,951 B2
(45) Date of Patent: Dec. 9, 2008

(54) TELEMATICS METHOD AND SYSTEM

(75) Inventors: Nathan D. Ampunan, Novi, MI (US); Dennis F. Regmont, Lake Orion, MI (US); Mark Rychlinski, Farmington Hills, MI (US); Krishnaraj Inbarajan, Troy, MI (US); Yilu Zhang, Plymouth, MI (US); Christopher L. Oesterling, Troy, MI (US)

(73) Assignee: General Motors Corporation, Detroit, MI (US)

( * ) Notice: Subject to any disclaimer, the term of this patent is extended or adjusted under 35 U.S.C. 154(b) by 462 days.

(21) Appl. No.: 11/235,962

(22) Filed: Sep. 27, 2005

(65) Prior Publication Data

US 2007/0073450 A1 Mar. 29, 2007

(51) Int. Cl.
*G05D 1/00* (2006.01)

(52) U.S. Cl. ............................... 701/1; 701/29; 701/36; 342/357.09

(58) Field of Classification Search ..................... 701/1, 701/29, 33, 36, 211, 213; 705/26; 342/357.09
See application file for complete search history.

(56) References Cited

U.S. PATENT DOCUMENTS 6,615,186 B1 * 9/2003 Kolls ........................... 705/26

* cited by examiner

*Primary Examiner*—Gertrude Arthur Jeangla

(57) ABSTRACT

A telematics method comprising the steps of: using a device in a vehicle, obtaining data including at least location and at least one device parameter during a time period between vehicle assembly and delivery to a retail customer; transmitting the data to a remote station for processing; conditionally communicating an alert for the vehicle responsive to the device parameter; and conditionally communicating, response to the device parameter and additional device parameters from additional vehicles, an alert for at least one of (a) a vehicle assembly plant, (b) a vehicle dealer, (c) a vehicle distribution center and (d) a vehicle logistical support center.

13 Claims, 2 Drawing Sheets

TELEMATICS METHOD AND SYSTEM

TECHNICAL FIELD

This invention relates to a telematics method.

BACKGROUND OF THE INVENTION

In a known example, telematics units embedded within mobile vehicles provide subscribers with connectivity to a telematics service provider (TSP). The TSP provides the subscriber with an array of services ranging from emergency call handling, stolen vehicle location assistance and diagnostic code uploading to making restaurant reservations. In a known example, telematics units are provisioned and activated at a point of sale when a subscriber purchases a telematics equipped vehicle. Upon activating, the telematics unit can be utilized to provide a subscriber with telematics services.

In another known example, the telematics unit is provisioned and activated at a manufacturing or assembly plant. In this example, the telematics unit may be capable of communicating with a service center once installed in a vehicle and power is available.

Published application US 2005/0075892 discloses a telematics unit and method for operating in which a telematics unit is operated in two modes. The telematics unit is operated first in a logistical support mode and second in a customer service mode.

SUMMARY OF THE INVENTION

Advantageously, according to an example, a telematics device is utilized to monitor vehicle parameters during shipment and storage and enhances vehicle maintenance by providing reports based upon the monitored parameters.

Advantageously, according to one example, a telematics method comprises the steps of: using a device installed in a vehicle, obtaining data including at least location and at least one device parameter during a time period between vehicle assembly and delivery to a retail customer; transmitting the data to a remote station for processing; conditionally communicating an alert for the vehicle responsive to the device parameter; and conditionally communicating, response to the device parameter and additional device parameters from additional vehicles, an alert for at least one of (a) a vehicle assembly plant, (b) a vehicle dealer, (c) a vehicle distribution center and (d) a vehicle logistical support center.

In another example, a telematics system comprises a device; and a remote station, wherein the device is installed in a vehicle and transmits to the remote station data including at least location and at least one device parameter during a time period between vehicle assembly and delivery to a retail customer, and wherein, the remote station conditionally communicates a first alert for the vehicle responsive to the device parameter, and conditionally communicates, in response to the device parameter and additional device parameters from additional vehicles, a second alert for at least one of (a) a vehicle assembly plant, (b) a vehicle dealer, (c) a vehicle distribution center and (d) a vehicle logistical support center.

DESCRIPTION OF AN EXEMPLARY EMBODIMENT

Figure 1:
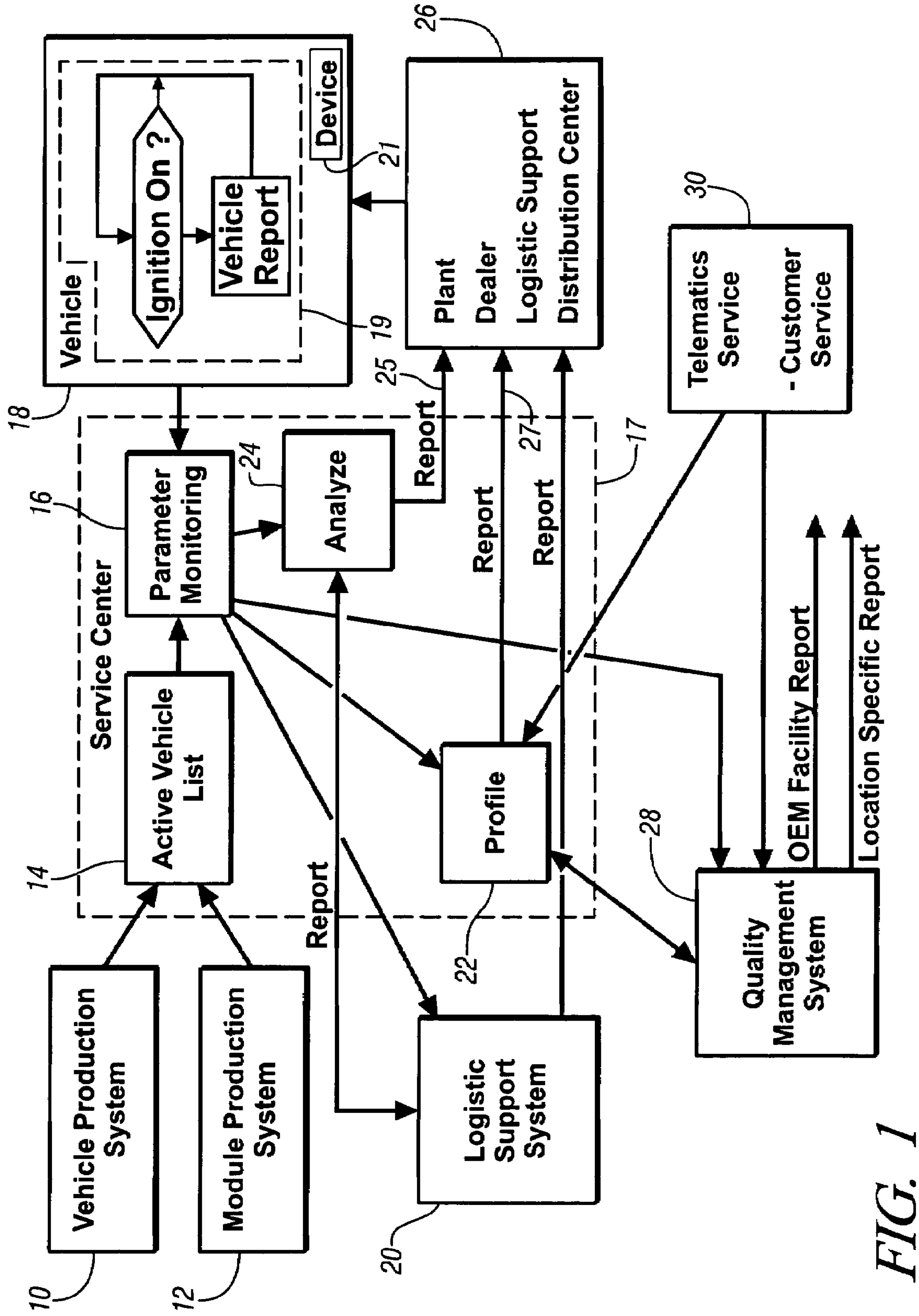
FIG. 1 illustrates an example telematics method and system.

Referring to FIG. 1, vehicles 18 are manufactured and begin transportation process to a destination where they are eventually delivered to a retail customer. During the transportation and storage the vehicle is remotely monitored and reports are generated that may be directed to individual vehicles, groups of vehicles and locations related to vehicle performance and servicing.

Block 10 represents a vehicle production management system including scheduling data for vehicles to be assembled at a vehicle assembly plant. In addition, or in alternative, vehicle production system 10 includes data for vehicles that have been built at an assembly plant.

Block 12 represents a component production system containing data for telematics-type components. The component production system 12 provides data such as station identification numbers, communication codes and any other component-unique information for a telematics-type unit 19 included in vehicles 18.

The information from the vehicle production system 10 and the component production system 12 is used to create a database or list 14 of active vehicles 18 for monitoring during the time period between production of vehicles 18 and delivery to a retail customer. A retail customer typically is a person who purchase the vehicle for personal use or a company that purchases the vehicle for fleet use.

Block 16 represents the parameter monitoring of each vehicle 18 corresponding to the active vehicle list 14. The telematics unit 19 in the vehicle is configured to monitor specific parameters for support during the time between vehicle assembly and delivery to a retail customer. This parameter monitoring may be in conjunction with logistical support functions described in published United States Patent Application 2005/0075892. The disclosure of US 2005/0075892 is incorporated herein by reference. In one example, every key-on of the ignition triggers the telematics unit 19 to check certain vehicle parameters and report those parameters to a remote service center 17 that receives the data from by the parameter monitoring function 16. Connection of telematics unit 19 to the remote service center 17 is achieved by any wireless connection or communication suitable for transmitting the required data. Example communication methodologies are known to one skilled in the art. In a known example for telematics systems, communications from the vehicle to a service center are made through mobile calling and/or paging networks.

In one example, vehicle battery open circuit voltage and state of charge are obtained at vehicle ignition-on. These can be obtained by the telematics unit 16 querying a control module (represented generically by reference 21) on the vehicle that routinely checks these battery parameters as is known in the art or by the telematics unit 16 performing the functions known for use in vehicles for monitoring vehicle battery voltage and state of charge.

Other vehicle parameters may be monitored, and those that require vehicle power up to monitor are triggered by the ignition-on event. For example, the number of ignition-on events can be monitored, indicating how often a vehicle is started. Door openings can be monitored indicating how often the interior of the new vehicle is accessed. Any available vehicle system or component parameter can be monitored. The other vehicle parameters may be obtained from other controllers on the vehicle or from the telematics unit 19 having the proper parameter inquiries programmed therein. Inquiries between the telematics unit and the components within the vehicle generally occur over a vehicle communication bus of a known type. Additional parameters may be monitored during telematics unit wake-up cycles that do not require ignition-on if they are available.

In addition to monitoring vehicle parameters, diagnostic trouble codes can be queried and reported to as part of the parameter monitoring 16 to the remote service center 17. The remote service center 17 that performs the parameter monitoring 16 may be a telematics service center providing services for a vehicle manufacturer or distributor or may be a telematics service facility within a vehicle manufacturer.

Over time, the remote service center obtains a set of data for vehicles 18 including for each vehicle monitored, the location, time of monitoring, specific parameter measurements, and any other data delivered during parameter monitoring 16. This data may be acquired at various times for each vehicle at various locations, for example, between manufacture and retail delivery. Thus, in the example of battery open circuit voltage and state of charge, the battery for each vehicle 18 can be monitored beginning at the vehicle assembly plant, during shipment, while at a vehicle distribution center or other logistics support facility and while at a car dealer awaiting sale and/or delivery to a retail customer.

There are several uses for the parameters monitored at block 16. As parameters are obtained by parameter monitoring 16 they are provided to an analysis function 24, representing software at service center 17 that compares the parameters obtained from vehicle 18 to specific criteria. For example, in the case of battery measurements, the battery voltage and/or state of charge may be compared to specific thresholds, and if either is below the corresponding threshold, block 24 issues an alert 25, such as a recommended action report. In one example the report is transmitted directly to a location having control of the vehicle, such as an assembly plant (if the vehicle has been built but not yet shipped), a distribution center, a logistical support service provider that may be shipping the vehicle, or a dealer where the vehicle may be located but not yet sold or delivered to a retail customer. In another example, the alert from the analysis at 24 may be delivered to a logistical support system that maintains records of vehicle location and the logistical support system may deliver the report of recommended vehicle action to the assembly plant, distribution center, logistical support service provider or car dealer.

The report provided by the analysis 24 may recommend a maintenance action such as charging the vehicle battery, or may call for replacement of a vehicle part if the analysis indicates diagnosis of a specific part.

The parameter monitoring 16 also provides information to the profile block 22, representing software for performing a function of profiling vehicle types and location performance for the monitored parameters. Profile block 22 may be included as part of the quality management system 28 or may be separately performed as part of a telematics logistical support service.

In one example, the profile function 22 correlates parameters obtained from vehicles 18 with logistical locations to identify whether specific parameter deviations are common to specific locations. For example, a vehicle assembly plant that consistently has battery parameters for newly assembled cars lower than average could indicate that the vehicle assembly plant is not handling batteries prior to or during installation in an optimal manner. A vehicle distribution center that consistently has battery parameters that drop below optimal could indicate that vehicle maintenance schedules are not followed correctly. Additionally, if a location has a greater correlation to vehicle service events that required part replacement, this could indicate that the location is not following proper vehicle or part storage, handling or maintenance procedures.

The correlations done with the profile function 22 can be implemented in a suitable manner known in the quality assurance and/or statistical analysis arts appropriate for adaptation to motor vehicles. In addition, the profile function 22 may receive information from a telematics service 30 that serves retail customers to provide a greater statistical basis for analysis.

The profile function 22 may issue reports 27 to a specific location, such as an assembly plant, distribution center, logistical support service or dealer recommending a specific practice to be applied to all vehicles 18, either across the board or of a certain type, to prevent deviations in measured parameters and the need for potential repairs from occurring. The location specific report may be either a reminder to follow established procedures or a recommended a location-specific procedure due to unique circumstances at that location. For example a location that tends to start vehicles more often without giving the vehicles' internal systems time to charge the battery may be placed on an enhanced maintenance schedule that ensures the battery remains charged.

The parameters for the profile function 22 can be further used by the quality management system 28 with a correlation analysis to correlate any parameter changes or deviations with specific service needs that occur. If a statistical correlation function identifies low battery voltage as occurring statistically more significantly with vehicles that are later found to have a part, for example a switch, that has a characteristic of draining current from the battery, the quality management system 28 can utilize parameter reports from the parameter monitoring 16 to identify vehicles for a service check of the particular part.

It is noted that the monitoring of parameters by the parameter monitoring 16 may be configured in a variety of ways. The telematics module 19 may be configured during production to obtain data for a predetermined set of parameters. Alternatively, during vehicle assembly, the telematics module may be configured to monitor certain parameters based upon input from a control system at the vehicle assembly plant. This can be utilized to target certain parameters of interest to the particular vehicle or the assembly plant location. Additionally, the telematics unit 19 may be remotely configurable, with the parameters to be monitored identified during a communication session with a remote station 17, or reconfigured during a parameter monitoring call. In yet another example, a command pass through system may be used in which a service center 17 during parameter monitoring 16 commands the parameters to be monitored and communicates instructions or actual data commands to the vehicle 18. One skilled in the art can implement any of these methods in view of the disclosure herein.

To operating in a logistical support context, the telematics unit may be configured to be activated upon internal or external events. An example internal event is a timer interrupt, where the timer interrupt sends an activation signal to the telematics unit causing the telematics unit to execute the routines within an internal program. The executing routines cause the GPS receiver to activate and attempt to acquire signals from the GPS satellites to determine current position. Alternatively, the logistical support program may access the vehicle position sensor suite in order to determine current position. If the current position is acquired, then the position is logged in telematics unit memory. The time and date associated with the acquired position is then recorded. When the time and date are successfully recorded, the logistical support program may also acquire other desired data by examining and recording vehicle module messages via the vehicle bus.

In one example, the GPS data acquired during the wake-up periods is used to determine movement of the vehicle, allowing logging of locations and travel during vehicle delivery. This information triggers calls to the service center supporting logistics on a predetermined basis. For example, when the first and second most recent positions indicate different geographical positions, and the second and third most recent positions were the same, new movement of the vehicle is determined and may be reported as an indication that the vehicle began movement through the logistical delivery system. And when the first and second most recent positions are the same, while the second and third were different, a cessation of travel may be inferred, and reported to the service center.

If the position, time and date, and/or other data cannot be accessed due to GPS blockage or lack of electrical power to vehicle modules, the logistical support program may activate a software timer to attempt to acquire data on a periodic basis. A partial report may be made during the parameter monitoring 16, or the data can be stored until a complete set is available. For example, during a subsequent wake-up period position data that was previously not available from the GPS unit may be acquired and the data report made.

Additionally, if the position, time and date, and/or other data cannot be accessed due to GPS blockage or lack of electrical power to vehicle modules, the logistical support program may instruct the telematics unit to acquire data upon the next vehicle event such as an ignition cycle, door opening, etc. Vehicle subsystems, such as vehicle modules, are fully energized and active during the period of an ignition cycle when the vehicle is running. A successful data report cancels any pending retry command due to previously incomplete data acquisition.

It is noted that the telematics unit may be activated via an event, such as ignition cycle, door handle access, security system stimulus, or other event specified by the configuration parameter. Any such event can be used to trigger a parameter monitoring 16 in which the telematics unit 19 contacts the service center and uploads data as described herein.

When a vehicle is prepared for customer delivery, usually at a dealership, the telematics unit logistical support program mode may be disabled and the subscriber support program mode is enabled. The switch in modes may be an internal software flag or may be a physical downloading of the subscriber support mode software into the telematics unit. Now in the second mode, the telematics unit behaves in a subscriber support context and is ready to be provisioned or otherwise readied for a specific subscriber. Alternatively, the telematics unit may be configured to disable logistic support mode and enable subscriber support by activating a subscriber account associated with the vehicle.

Figure 2:
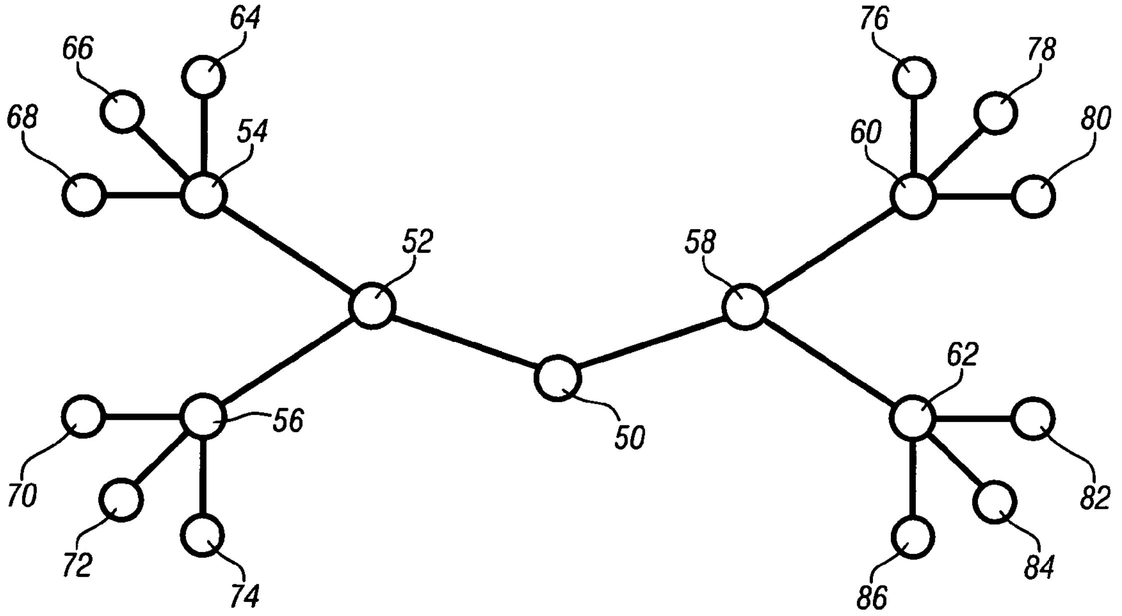
FIG. 2 illustrates an example travel path of vehicles for which parameter monitoring may be implemented.

Referring now also to FIG. 2, the example shows travel paths of vehicles from assembly plant 50 to various destinations, such as vehicle dealerships 64-86. During travel, the vehicles pass through various points 52-62 that may represent distribution centers or parts of the logistical support system for vehicle delivery. At each location 52-86 that requires vehicle power on to move the vehicle, an ignition-on parameter monitoring 16 will occur. Parameter monitoring 16 can also be triggered by time and location events during a wake-up period of the telematics unit 19. Through the parameter monitoring 16 and analysis 24, an individual vehicle at distribution point 58 may be identified for maintenance, in which case the appropriate message or report 25 is communicated as described above.

Through the profile function 22, a location may be identified, such as distribution point 54 or dealership 76, at which a specific parameter deviates from the statistical norm on a regular basis. In this case, an alert or report 27 is provide to distribution point 54 or dealership 76 and may recommend a review of current maintenance practices or a modified maintenance practice, for example, to ensure that batteries do not drain to an unacceptably low level.

The alerts and reports for specific vehicles, for vehicle families or for specific locations may be provided in any number of formats and through any number of communications means. They may be provided on a service center system as display items to service center operators, they may be transmitted as electronic messages over networks, for example in the form of automated electronic mail, or may be printed for review in paper form. Alerts and reports may be directed either directly to the specific location affected or to a central control function, such as a logistical management function or a quality management function, that will then take steps as appropriate.

The above example is based upon a telematics device located in the vehicle and the control for the monitoring distributed between the vehicle 18 and the remote service center 17 and assumes that the telematics unit 19 in vehicle 18 directly communications with the service center 17 through a network. In another example, the monitoring may be further distributed with the vehicles containing a short-range communication capability and a device (either fixed or portable) located at each location or with each group of vehicles for querying the vehicles over short range wireless connections and communicating with the remote service center 17 over a network.

The invention claimed is:

1. A telematics method comprising the steps of:

using an in-vehicle telematics device on a vehicle, obtaining a vehicle data set including at least location and time and at least one device parameter during a time period between vehicle assembly and delivery to a retail customer;

first comparing the data set to first criteria;

responsive to the first comparing, issuing a service report for the vehicle with at least one recommended action for the vehicle before delivery to the retail customer;

second comparing the data set along with additional data sets from additional vehicles to a second criteria; and responsive to the second comparing, issuing a service practices report with at least one recommended action for one of (a) a vehicle assembly plant, (b) a vehicle dealer, (c) a vehicle distribution center and (d) a vehicle logistical support center.

2. The method of claim 1, wherein the vehicle is tracked during shipment and delivery prior to sale of the vehicle to the retail customer.

3. The method of claim 1 wherein the data set comprises at least one of vehicle module diagnostic codes, battery voltage, vehicle bus signals, vehicle security system status, an analog signal from a vehicle device and a digital signal from the vehicle device.

4. The method of claim 1, wherein the at least one device parameter includes voltage of a battery in the vehicle.

5. The method of claim 1, wherein the first criteria is a threshold value for the at least one device parameter, and wherein the second criteria is a statistical norm for the at least one device parameter.

6. The method of claim 1, wherein the second comparing further comprises:

correlating the at least one device parameter and device parameters received from the additional vehicles with logistical locations; and identifying whether a specific device parameter deviation is common to a specific location selected from the vehicle assembly plant, the vehicle dealer, the vehicle distribution center, and the vehicle logistical support center.

7. The method of claim 1, further comprising transmitting the service report for the vehicle to one of i) a location having control of the vehicle or ii) a logistical support system that maintains records of the vehicle's location.

8. The method of claim 1, wherein the telematics device is in a logistical support program mode, and wherein the method further comprises:

preparing the vehicle for customer delivery; and switching the logistical support program mode to a subscriber support program mode.

9. A telematics method comprising the steps of:

using a device installed in a vehicle, obtaining data including at least location and at least one device parameter during a time period between vehicle assembly and delivery to a retail customer;

transmitting the data to a remote station for processing;

conditionally communicating a first alert for the vehicle responsive to a comparison of the at least one device parameter with first criteria; and conditionally communicating, in response to a comparison of the at least one device parameter and additional device parameters from additional vehicles with second criteria, a second alert including a service practices report to at least one of (a) a vehicle assembly plant, (b) a vehicle dealer, (c) a vehicle distribution center and (d) a vehicle logistical support center.

10. The method of claim 9, wherein the at least one device parameter includes voltage of a battery in the vehicle.

11. The method of claim 9, wherein the first alert contains at least one recommended action for the vehicle.

12. The method of claim 9, wherein the comparison of the at least one device parameter and the additional device parameters from additional vehicles with the second criteria includes:

correlating the at least one device parameter and device parameters received from the additional vehicles with logistical locations; and identifying whether a specific device parameter deviation is common to a specific location selected from the vehicle assembly plant, the vehicle dealer, the vehicle distribution center, and the vehicle logistical support center;

wherein the second alert is based upon identification of the specific device parameter being common to the specific location.

13. A telematics system comprising:

a device; and a remote station, wherein the device is installed in a vehicle and transmits to the remote station data including at least location and at least one device parameter during a time period between vehicle assembly and delivery to a retail customer, and wherein, the remote station conditionally communicates a first alert for the vehicle responsive to a comparison of the device parameter with first criteria, and conditionally communicates, in response to a comparison of the device parameter and additional device parameters from additional vehicles with second criteria, a second alert including a service practices report to at least one of (a) a vehicle assembly plant, (b) a vehicle dealer, (c) a vehicle distribution center and (d) a vehicle logistical support center.

* * * * *